(12) United States Patent  
Rottman et al.

(10) Patent No.: US 8,813,548 B2  
(45) Date of Patent: Aug. 26, 2014

(54) SENSOR MOUNTING ARRANGEMENT OF A WHEEL ASSEMBLY

(75) Inventors: Joseph L. Rottman, Decatur, IL (US); Kenneth M. De Luca, Forsyth, IL (US); Brandon D. Mann, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 181 days.

(21) Appl. No.: 13/451,710

(22) Filed: Apr. 20, 2012

(65) Prior Publication Data

US 2013/0276523 A1 Oct. 24, 2013

(51) Int. Cl.
*G01M 17/10* (2006.01)

(52) U.S. Cl.
USPC ..................................... 73/115.08

(58) Field of Classification Search
USPC ............ 73/115.01, 115.07, 115.08, 117.01
See application file for complete search history.

(56) References Cited

U.S. PATENT DOCUMENTS

| 2,796,482 | A |  | 6/1957 | Inderau |
| 3,792,533 | A |  | 2/1974 | Plasser |
| 3,887,046 | A |  | 6/1975 | Bueler |
| 3,944,864 | A | * | 3/1976 | Jovick ........................... 310/168 |
| 4,229,051 | A |  | 10/1980 | Mekosh |
| 6,435,238 | B1 |  | 8/2002 | Hennig |
| 7,089,791 | B2 |  | 8/2006 | Pradier |
| 7,302,979 | B2 |  | 12/2007 | Davison |
| 7,686,313 | B2 | * | 3/2010 | Folger et al. ............. 280/93.512 |
| 2002/0105222 | A1 | * | 8/2002 | Gautier ............................. 301/1 |
| 2004/0173014 | A1 | * | 9/2004 | Pradier et al. ................... 73/146 |
| 2005/0110339 | A1 |  | 5/2005 | Kolberg |
| 2006/0207705 | A1 | * | 9/2006 | Davison et al. ............... 152/415 |
| 2006/0277985 | A1 | * | 12/2006 | Faetanini ........................ 73/121 |
| 2010/0163323 | A1 |  | 7/2010 | Pickholz |

FOREIGN PATENT DOCUMENTS

DE 19625746 1/1998

* cited by examiner

*Primary Examiner* — Eric S McCall

(57) ABSTRACT

A sensor mounting arrangement of a wheel assembly having a spindle defining an elongated cavity is provided. The spindle rotatably supports a wheel. The sensor mounting arrangement comprises a tube, a wire harness, and a sensor assembly. The tube is configured to be partially received in the elongated cavity of the spindle. The wire harness is routed through the tube. The sensor assembly is connected to a leading end of the wire harness wherein the leading end is configured to be disposed proximal to the wheel.

13 Claims, 4 Drawing Sheets

SENSOR MOUNTING ARRANGEMENT OF A WHEEL ASSEMBLY

TECHNICAL FIELD

The present disclosure relates to a sensor mounting arrangement, and more particularly to a sensor mounting arrangement of a wheel assembly.

BACKGROUND

Tachometer systems are generally used to measure speed of rotating wheels. During installation, a tachometer system is usually mounted at a position exterior to an axle of a wheel since the axle is a compact monolithic component that has little or no space to accommodate the tachometer system internally. Further, the tachometer system, when mounted in an environment open to atmosphere, is subject to dirt, grime, soil, water and chemicals which may interfere with the working of the tachometer system. Furthermore, the tachometer system may be also subject to physical damages due to collision with undesirable matter such as sand, stones, rocks and dirt. Furthermore, the damage may be enhanced when subjecting the tachometer system to a high pressure wash of the vehicle. Hence, an externally mounted tachometer system lacks protection and durability. Subsequently the externally mounted tachometer system entails frequent cleaning, maintenance and replacement in such a mounting arrangement.

German Patent 19625746 ('746 patent) relates to a tachometer system including at least one sensor surrounded by a sensor housing arranged on a wheel carrier of a non-driven wheel. The tachometer system further includes a rotor magnetized in sections and fastened to a hub region of the wheel. The sensor and the rotor are housed in a central hub cavity. The rotor is therefore located in one section of the hub cavity, whereas the sensor is fastened via the sensor housing thereof to the free end of an axle pin projecting from the wheel carrier. Access can easily be gained, in the hub cavity, from the outside of the wheel to the tachometer system. However, the '746 German patent discussed above lacks a capability of accommodating a fluid substance in the axle pin and a pressure equalization system in place to maintain a safe working pressure of the fluid within.

SUMMARY OF THE DISCLOSURE

In one aspect, the present disclosure provides a sensor mounting arrangement of a wheel assembly having a spindle defining an elongated cavity. The spindle rotatably supports a wheel. The sensor mounting arrangement comprises a tube, a wire harness, and a sensor assembly. The tube is configured to be partially received in the elongated cavity of the spindle. The wire harness is routed through the tube. The sensor assembly is connected to a leading end of the wire harness wherein the leading end is configured to be disposed proximal to the wheel.

In another aspect, the present disclosure discloses a wheel assembly comprising a spindle with an elongated cavity, a wheel rotatably supported on the spindle, and a sensor mounting arrangement. The sensor mounting arrangement includes a tube, a wire harness, and a sensor assembly. The tube is configured to be partially received in the elongated cavity of the spindle. The wire harness is routed through the tube. The sensor assembly is connected to a leading end of the wire harness wherein the leading end is configured to be disposed proximal to the wheel.

In another aspect, the present disclosure discloses a method of mounting a sensor assembly for a wheel rotatably supported on a spindle defining an elongated cavity. The method includes positioning a tube partially within the elongated cavity of the spindle. The method further includes routing a wire harness through the tube. The method further includes connecting the sensor assembly to the wire harness wherein the sensor assembly is disposed proximal to the wheel.

Other features and aspects of this disclosure will be apparent from the following description and the accompanying drawings.

DETAILED DESCRIPTION

Figure 1:
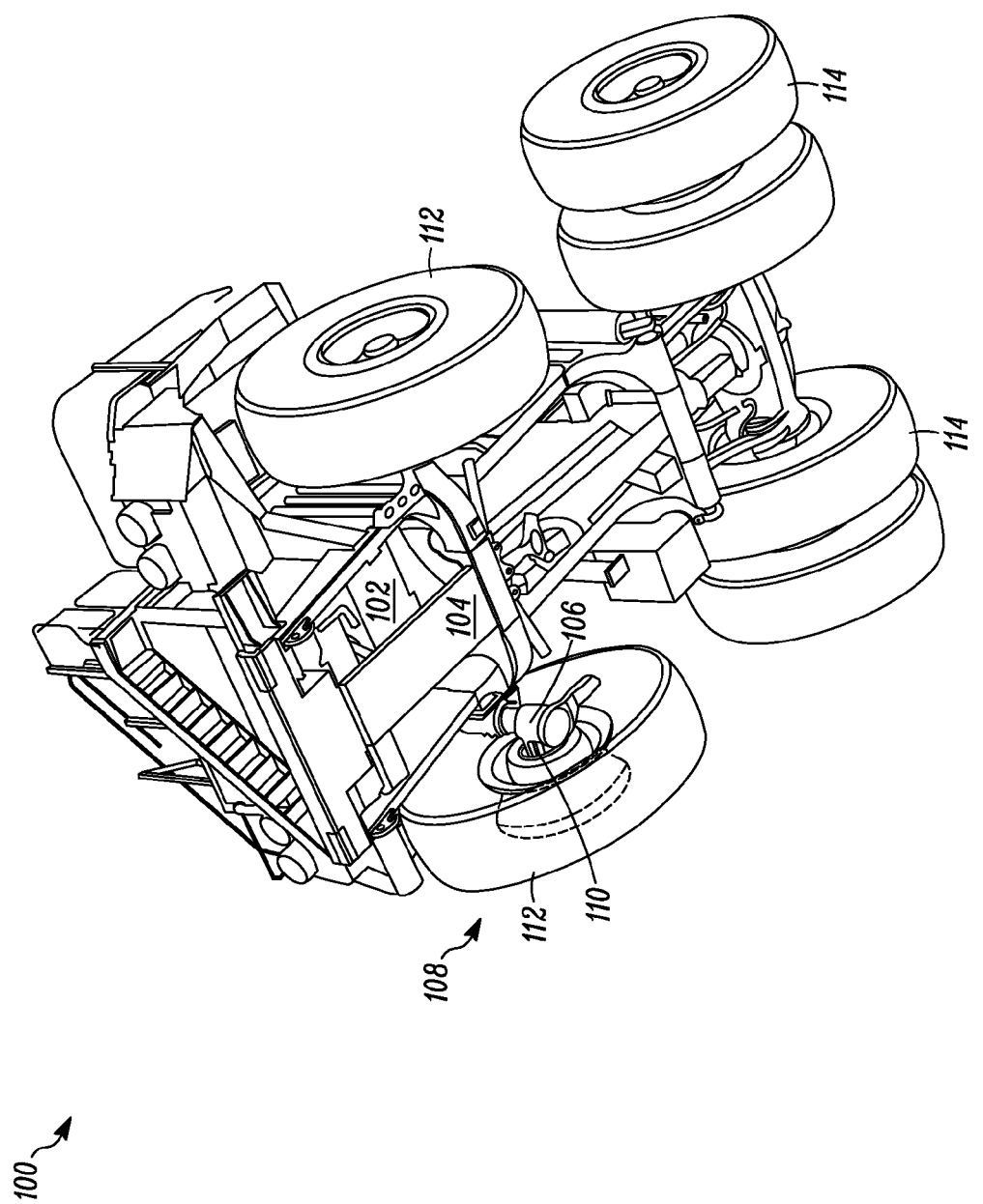
FIG. 1 is a perspective view of an exemplary machine.

The present disclosure relates to a sensor mounting arrangement 118 of a wheel assembly 108 having a spindle 110 defining an elongated cavity 116. FIG. 1 shows a perspective view of an exemplary machine 100. The machine 100 may be a wheeled industrial vehicle, for example, but not limited to, mining trucks, loaders, material handlers, wheeled dozers, and the like. In an embodiment, as shown in FIG. 1, the machine 100 may embody a mining truck which may be used for carrying a load such as ore extracted from the earth.

Further, the machine 100 includes a prime mover 102, a frame 104, multiple struts 106 and multiple wheel assemblies 108. The prime mover 102 is mounted on the frame 104. The prime mover 102 may be a fuel based engine to power the machine 100 by combustion of natural resources, such as gasoline, other petroleum products or liquid natural gas. Moreover, the engine may be a petrol engine, diesel engine, or any other kind of engine utilizing combustion of fuel for generation of power. In an embodiment, the prime mover 102 may be an electric motor.

Each of the wheel assemblies 108 includes a spindle 110, and a wheel 112. The wheel 112 is rotatably supported on the spindle 110. The spindle 110 is configured to be connected to a strut 106. Hence, the strut 106 connects the spindle 110 of the wheel assembly 108 to the frame 104. This connection accomplished between the spindle 110 and the frame 104 by the strut 106 is analogous to a spring-mass damper system. The connection of the spindle 110 and strut 106 ensures that shocks and impacts absorbed by the wheel 112 are transferred to the strut 106 via the spindle 110 and dissipated away from the frame 104. A person having ordinary skill in the art will acknowledge that the strut 106 maybe of a hydraulic type or a pneumatic type.

The wheels 112 disclosed herein are idle wheels 112 since they are not directly powered by the prime mover 102. Hence, the wheels 112 may be used for steering and subsequently controlling of the machine 100. The machine 100 further comprises powered rear wheels 114 which are connected to the prime mover 102 of the machine 100. Hence, movement of the powered rear wheels 114 causes movement of the wheels 112.

In an embodiment of the present disclosure, a control system may be remotely located with respect to the machine 100 and wirelessly connected to the machine 100. The control system may wirelessly control a steering system of the machine 100, thus controlling the machine 100 without the need for an operator.

Figure 2:
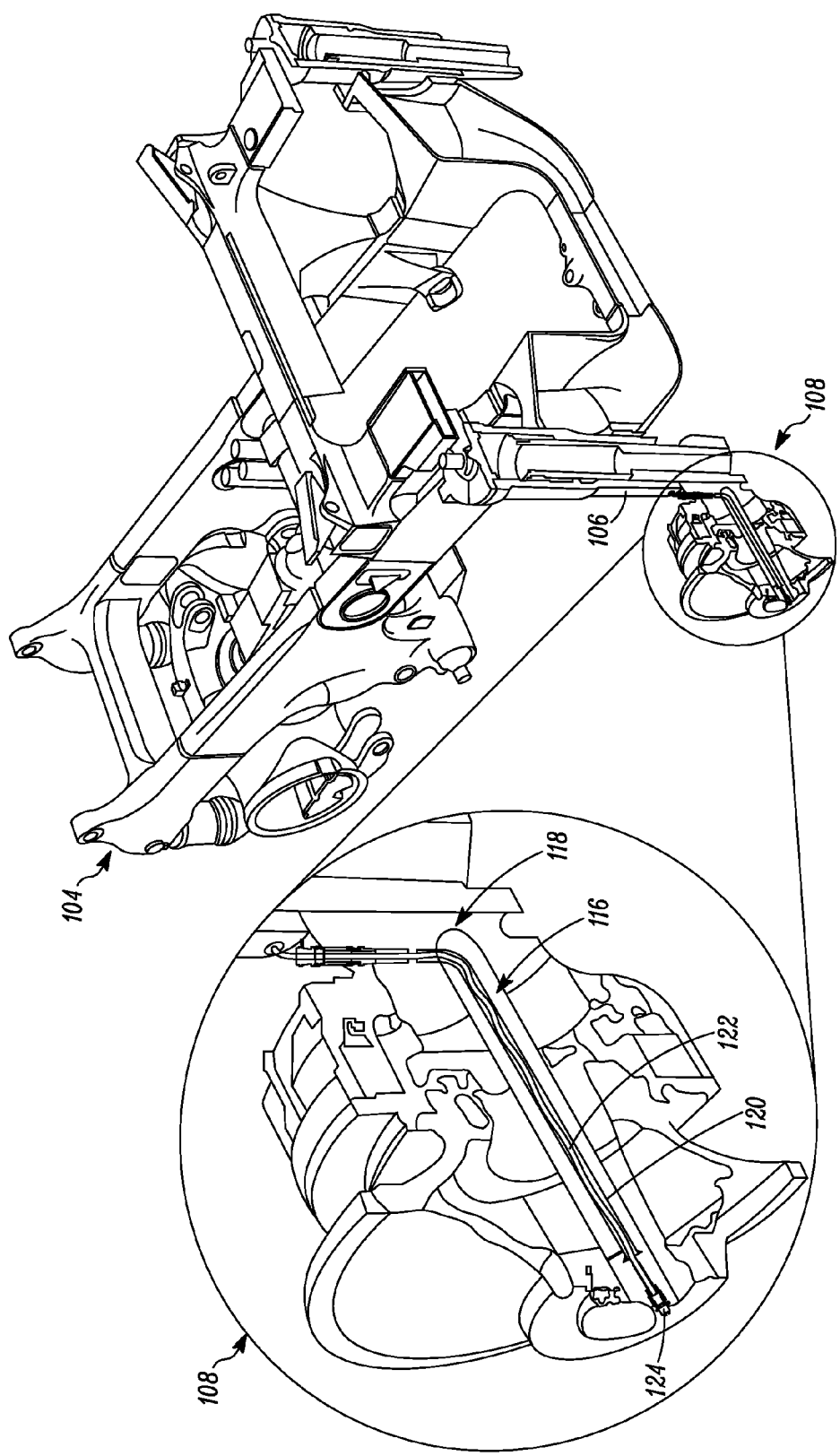
FIG. 2 is a cut away perspective view of a wheel assembly of the exemplary machine.

FIG. 2 shows a cut away front perspective view of a wheel assembly 108 of the exemplary machine 100. The spindle 110 of the wheel assembly 108 includes an elongated cavity 116. Each of the wheel assemblies 108 further includes a sensor mounting arrangement 118. The sensor mounting arrangement 118 includes a tube 120, a wire harness 122, and a sensor assembly 124. The tube 120 is partially received in the elongated cavity 116 of the spindle 110. The wire harness 122 is routed through the tube 120. The sensor assembly 124 is connected to a leading end 126 of the wire harness 122 wherein the leading end 126 is disposed proximal to the wheel 112. In an embodiment as shown in FIG. 2, the wire harness 122 is configured to be received by the strut 106. The wire harness 122 may be configured to carry a wheel-speed signal sensed by the sensor assembly 124. In an embodiment wherein the machine 100 is remotely and wirelessly controlled, or used in an autonomous control environment, the wheel-speed signal may be wirelessly communicated to a tachometer read-out device that may be present in the remotely located control system. This wheel-speed signal may assist the control system in monitoring a condition and controlling the machine 100.

Figure 3:
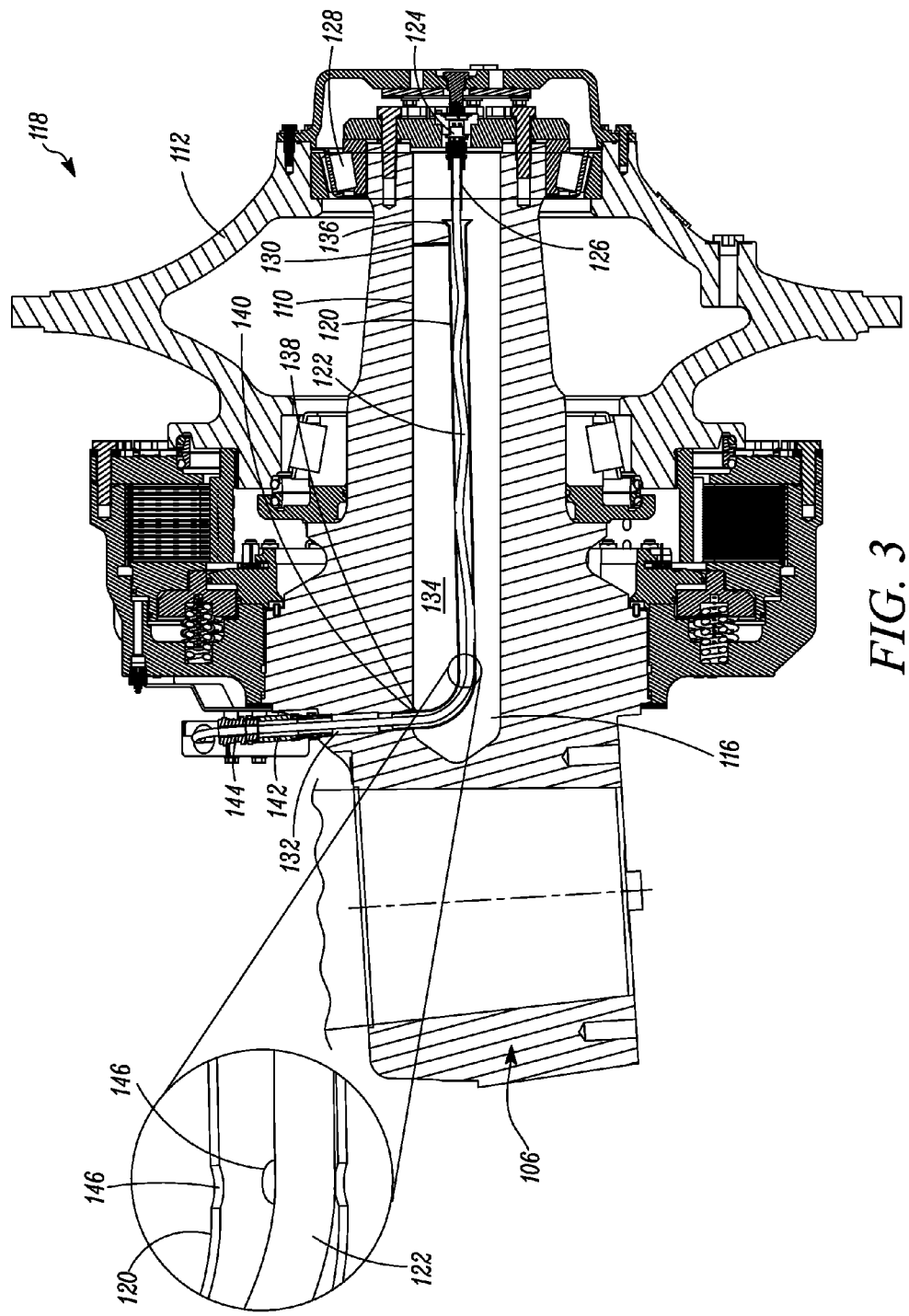
FIG. 3 is a sectional view of a strut spindle assembly.

FIG. 3 shows a sectional view of the sensor mounting arrangement 118. In an embodiment, the wheel 112 may be rotatably supported on the spindle 110 by a roller bearing 128. Hence, the wheel 112 rotates about the stationary spindle 110 via the roller bearing 128. In an embodiment as shown in FIG. 3, the tube 120 includes a first end 130 configured to be received in the elongated cavity 116 of the spindle 110 and a second end 132 configured to be disposed outside the elongated cavity 116 of the spindle 110. In an embodiment, the first end 130 of the tube 120 is configured to be connected to an internal wall 134 of the spindle 110. In another embodiment as shown in FIG. 3, the first end 130 of the tube 120 has a flare 136 configured to be connected to the internal wall 134 of the spindle 110. The flare 136 may be rigidly connected to the internal wall 134 of the spindle 110 by welding, brazing or any other known method in the art.

In an embodiment as shown in FIG. 3, the tube 120 has a neck portion 138 disposed between the first end 130 and the second end 132. In this embodiment, the spindle 110 includes an opening 140 to receive the neck portion 138 of the tube 120. Further, in this embodiment, the neck portion 138 of the tube 120 adjacent to the opening 140 of the spindle 110 is swaged. Thus, the swaged neck portion 138 of the tube 120 may be snugly received within the opening 140 of the spindle 110 and may establish a close fit with the opening 140.

In an embodiment as shown in FIG. 3, the second end 132 of the tube 120 is configured to be connected to a breather shaft 142. In this embodiment, the second end 132 of the tube 120 is swaged. Thus, the swaged second end 132 of the tube 120 may be snugly connected to the breather shaft 142 and may establish a close fit with the breather shaft 142. A person of ordinary skill in the art will appreciate that the method of connecting the neck portion 138 to the opening 140 and the second end 132 to the breather shaft 142 described above is exemplary in nature and does not limit the scope of this disclosure. Any known method may be used to accomplish the connections of the neck portion 138 to the opening 140 and the second end 132 to the breather shaft 142.

In an embodiment as shown in FIG. 3, a grommet 144 may be detachably attached to the breather shaft 142. A person of ordinary skill in the art will acknowledge that the grommet 144 may be detachably attached to the breather shaft 142 by any commonly known processes such as snap-fit, screwing, or swaging. It is to be understood that any similar process may be used to accomplish the detachable attachment of the grommet 144 to the breather shaft 142.

In an embodiment as shown in FIG. 3, the tube 120 includes perforations 146. As disclosed above, the first end 130 of the tube 120 is configured to be received in the elongated cavity 116 of the spindle 110. The elongated cavity 116 is generally filled with a lubricant, for example, oil, to lubricate the roller bearing 128 mounted on the spindle 110. Since, the elongated cavity 116 is filled with the lubricant, whose fluid level varies as the machine 100 travels uphill or downhill, the perforations 146 in the tube 120 allow the lubricant to move into and out of the tube 120 and hence maintain an overall consistent fluid level in the elongated cavity 116.

Furthermore, pressure levels within the elongated cavity 116 may vary during operation of the machine 100 with the presence of the lubricant. Hence, the lubricant in the elongated cavity 116 may need to pneumatically communicate with the atmosphere via the perforations 146 in the tube 120 and the breather shaft 142. Therefore, the perforations 146 in the tube 120 help equalize pressure and maintain equilibrium in the pressure levels within the elongated cavity 116.

Industrial Applicability

Figure 4:
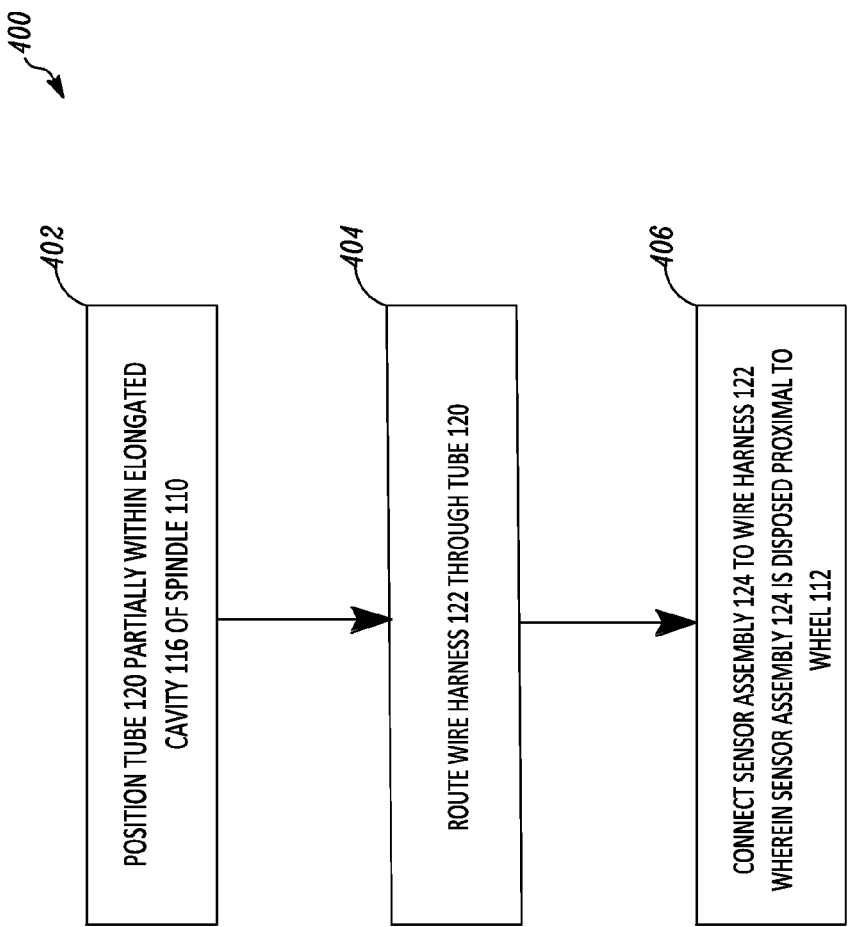
FIG. 4 shows a method of mounting a sensor assembly for a wheel rotatably supported on a spindle.

FIG. 4 shows a method 400 of mounting the sensor assembly 124 for the wheel 112 rotatably supported on the spindle 110 defining the elongated cavity 116. At step 402, the tube 120 is positioned partially within the elongated cavity 116 of the spindle 110. At step 404, the wire harness 122 is routed through the tube 120. Further, at step 406, the sensor assembly 124 is connected to the wire harness 122 wherein the sensor assembly 124 is disposed proximal to the wheel 112.

In an embodiment, positioning the tube 120 partially within the elongated cavity 116 of the spindle 110 includes positioning the first end 130 of the tube 120 proximal to the wheel 112 and connecting the first end 130 of the tube 120 to the internal wall 134 of the spindle 110.

In another embodiment, positioning the tube 120 partially within the elongated cavity 116 of the spindle 110 includes positioning the second end 132 of the tube 120 outside the elongated cavity 116 of the spindle 110 and connecting the second end 132 of the tube 120 to the breather shaft 142. In another embodiment, the wire harness 122 is configured to be received by the strut 106 via the breather shaft 142.

The sensor assembly 124 is generally used to measure a rotational speed of the wheels 112. In an embodiment as disclosed above, the control system may be remotely located with respect to the machine 100 and may wirelessly control the steering system of the machine 100, thus controlling the machine 100. In this embodiment, the sensor assembly 124 provides critical data such as revolutions per min (rpm), speed in kilometers per hour (km/h) or miles per hour (mph), to the control system so that the control system may appropriately control the machine 100 by suitable wireless operations.

Further, the wire harness 122 is used to operatively connect the sensor assembly 124 to the wheel 112. In operation, the sensor assembly 124 and the wire harness 122 need to be protected from undesirable matter such as sand, stones, rocks and dirt since the undesirable matter can interfere with the working of the sensor assembly 124. Further, the sensor assembly 124 may be subjected to physical damages due to collision with the undesirable matter when the sensor assembly 124 is mounted in an exposed environment. Furthermore, damages to the sensor assembly 124 can occur when the machine 100 is subjected to a high pressure wash. A large number of protective assemblies used to address this issue generally involve connecting retrofit or extraneous structures to the machine 100. While this may prove to be uneconomical, the protective assemblies also render the sensor assembly 124 without protection and durability. Hence, the sensor mounting arrangement 118 provided for the wire harness 122 of the sensor assembly 124 addresses the aforementioned issues in a compact and work effective manner.

In an embodiment, during manufacture of the sensor mounting arrangement 118, the tube 120 is manufactured with an external diameter lesser than an internal diameter of the spindle 110. The flare 136 may provide a smooth circumferential edge to avoid the abrading of the wire harness 122 routed through the tube 120.

In an embodiment, during assembly, the grommet 144 may be screwed onto the breather shaft 142 to accomplish a detachable attachment with the breather shaft 142. As in the case of the flare 136, the grommet 144 also provides a smooth circumferential edge while receiving flexible components such as wires, pipes, ropes, and cables. The smooth circumferential edge avoids abrading the wires or cables that are received in the grommet 144. Hence, the grommet 144 allows the wire harness 122 to make contact with the smooth circumferential edge and thus prevent abrasion and subsequently snapping of the wire harness 122. Further in this embodiment, the wire harness 122 may be inserted into the grommet 144 and passed sequentially through the breather shaft 142, the second end 132 of the tube 120, and lastly the first section of the tube 120. As shown in FIG. 3, the wire harness 122 is passed until the leading end 126 of the wire harness 122 is disposed proximal to the wheel 112 where the sensor assembly 124 can be conveniently connected to the leading end 126 of the wire harness 122.

In another embodiment, a portion of the breather shaft 142 itself may be contoured to provide the smooth circumferential edge and prevent abrasion of the wire harness 122. A person having ordinary skill in the art may appreciate that the smooth circumferential edge provided by the breather shaft 142 is economically viable and easy to manufacture since the smooth circumferential edge and the breather shaft 142 are integral and a need for an additional component such as the grommet 144 is avoided.

In the embodiment disclosed above, the perforations 146 on the tube 120 allows for pressure equalization in the elongated cavity 116 with respect to the atmosphere. In an operational mode and when the elongated cavity 116 is partially filled with the lubricant, the remaining portion of the elongated cavity 116 may get filled with vacuum. Thus, the lubricant may not flow and lubricate the roller bearing 128. Hence, the perforations 146 on the tube 120 allow aeration and pressure equalization in the cavity by providing pneumatic connectivity between the cavity and the atmosphere. Further, due to efficient pressure equalization, the possibility of the lubricant oozing out of the spindle 110 through the opening 140 is reduced. Lastly, the perforations 146 allow the lubricant to maintain a consistent fluid level in the elongated cavity 116 of the spindle 110.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

We claim:

1. A sensor mounting arrangement of a wheel assembly, the wheel assembly having a spindle defining an elongated cavity, the spindle rotatably supporting a wheel, the sensor mounting arrangement comprising:
   a tube defining perforations and including a first end received in the elongated cavity of the spindle and a second end disposed outside the elongated cavity of the spindle, the second end of the tube is connected to a breather shaft so that the elongated cavity is able to pneumatically communicate with atmosphere;
   a wire harness routed through the tube; and
   a sensor assembly connected to a leading end of the wire harness, the leading end disposed proximal to the wheel.

2. The sensor mounting arrangement of claim 1, wherein the first end of the tube is connected to an internal wall of the spindle.

3. The sensor mounting arrangement of claim 1, wherein the first end of the tube has a flare for connection to an internal wall of the spindle.

4. A wheel assembly comprising:
   a spindle defining an elongated cavity;
   a wheel rotatably supported on the spindle; and
   a sensor mounting arrangement including:
      a tube defining perforations and including a first end received in the elongated cavity of the spindle and a second end disposed outside the elongated cavity of the spindle, the second end of the tube is connected to a breather shaft so that the elongated cavity is able to pneumatically communicate with atmosphere;
      a wire harness routed through the tube; and
      a sensor assembly connected to a leading end of the wire harness, the leading end disposed proximal to the wheel.

5. The wheel assembly of claim 4, wherein the first end of the tube is connected to an internal wall of the spindle.

6. The wheel assembly of claim 4, wherein the first end of the tube has a flare connected to an internal wall of the spindle.

7. The wheel assembly of claim 4, wherein the tube has a neck portion disposed between the first end and the second end.

8. The wheel assembly of claim 7, wherein the spindle includes an opening to receive the neck portion of the tube.

9. The wheel assembly of claim 4, wherein the spindle is connected to a strut.

10. The wheel assembly of claim 9, wherein the wire harness is received by the strut.

11. A method of mounting a sensor assembly for a wheel, the wheel rotatably supported on a spindle defining an elongated cavity, comprising:
   positioning a first end of a tube having perforations partially within the elongated cavity of the spindle;
   positioning a second end of the tube having perforations outside the elongated cavity of the spindle and connecting the second end to a breather shaft so that the elongated cavity is able to pneumatically communicate with atmosphere;
   routing a wire harness through the tube;
   connecting the sensor assembly to the wire harness wherein the sensor assembly is disposed proximal to the wheel.

12. The method of claim 11, wherein positioning the tube partially within the elongated cavity of the spindle includes positioning a first end of the tube proximal to the wheel and connecting the first end of the tube to an internal wall of the spindle.

13. The method of claim 11 further includes configuring the wire harness to be received by a strut via a breather shaft.

* * * * *

UNITED STATES PATENT AND TRADEMARK OFFICE
CERTIFICATE OF CORRECTION

PATENT NO. : 8,813,548 B2  
APPLICATION NO. : 13/451710  
DATED : August 26, 2014  
INVENTOR(S) : Rottman et al.

Page 1 of 1

It is certified that error appears in the above-identified patent and that said Letters Patent is hereby corrected as shown below:

In the Specification

Column 4, line 24, delete "Industrial Applicability" and insert -- INDUSTRIAL APPLICABILITY --.

Signed and Sealed this  
Twenty-second Day of September, 2015

Michelle K. Lee  
*Director of the United States Patent and Trademark Office*